Jan. 29, 1963 R. D. ISAAK 3,076,143

CLOCK PULSE, SAMPLE PULSE, AND INHIBIT PULSE GENERATOR

Filed March 6, 1961 2 Sheets-Sheet 1

INVENTOR.
ROBERT D. ISAAK
BY
ATTORNEYS

Jan. 29, 1963 R. D. ISAAK 3,076,143

CLOCK PULSE, SAMPLE PULSE, AND INHIBIT PULSE GENERATOR

Filed March 6, 1961 2 Sheets-Sheet 2

INVENTOR.
ROBERT D. ISAAK
BY
[signatures]
ATTORNEYS

United States Patent Office 3,076,143

Patented Jan. 29, 1963

3,076,143

CLOCK PULSE, SAMPLE PULSE, AND INHIBIT PULSE GENERATOR

Robert D. Isaak, San Diego, Calif., assignor to the United States of America as represented by the Secretary of the Navy Filed Mar. 6, 1961, Ser. No. 93,815
9 Claims. (Cl. 328—62)
(Granted under Title 35, U.S. Code (1952), sec. 266)

The invention described herein may be manufactured and used by or for the Government of the United States of America for governmental purposes without the payment of any royalties thereon or therefor.

This invention relates generally to extremely accurate timing means for data processing and digital sampling systems and particularly concerns a means for accurately generating, correlating, and synchronizing a plurality of reliable timing pulses by means of slaving a forced oscillator to an acoustic delay line.

The devices of the prior art perform this function to some extent by techniques employing reasonably stable oscillators in conjunction with reasonably stable delay lines, both of which are temperature controlled by suitable ovens, etc. However, in many instances, these devices proved to be unsatisfactory because the temperature stabilization was imperfect and considerable control equipment was necessary. As a result, uncontrolled changes in temperature caused variations in voltages, and current, which, in turn, caused the timing pulses to easily get out of step; consequently, only those systems which could tolerate loss or gain of an extra sample or inhibit pulse would operate in a satisfactory manner.

The present invention overcomes these objections in that no temperature stabilization and, hence, no temperature control equipment is required to provide timing pulses having vastly improved timing accuracy. Since the clock oscillator is slave-driven by and, therefore, always synchronized with an acoustic delay line, there will always be one and only one sample pulse and one inhibit pulse generated thereby, and the oscillator, crystal, delay lines, etc., combined to produce same need not be physically located near to one another for temperature control purposes.

It is, therefore, an object of this invention to provide an improved clock pulse—sample pulse—inhibit pulse generator that may be used with digital sampling devices.

Another object of this invention is to provide an accurate timing means for use with signal delay line time compressors, conventionally known as Deltics.

A further object of this invention is to provide an improved timing pulse generator which requires no temperature compensation or control.

Another object of this invention is to provide a stable pulse generating means having operational components which need not be disposed in close proximity to one another in order to produce exceedingly accurate timing pulses.

Still another object of this invention is to provide a compact stable pulse generating means requiring reduced space.

A further object of this invention is to provide an improved pulse timing apparatus having an oscillator slaved to an acoustical delay line in such manner as to cause all bits in the timing delay loop to be "ones" except one bit which is a "zero."

Other objects and many of the attendant advantages of this invention will be readily appreciated as the same becomes better understood by reference to the following detailed description when considered in conjunction with the accompanying drawings wherein.

Figure 1:
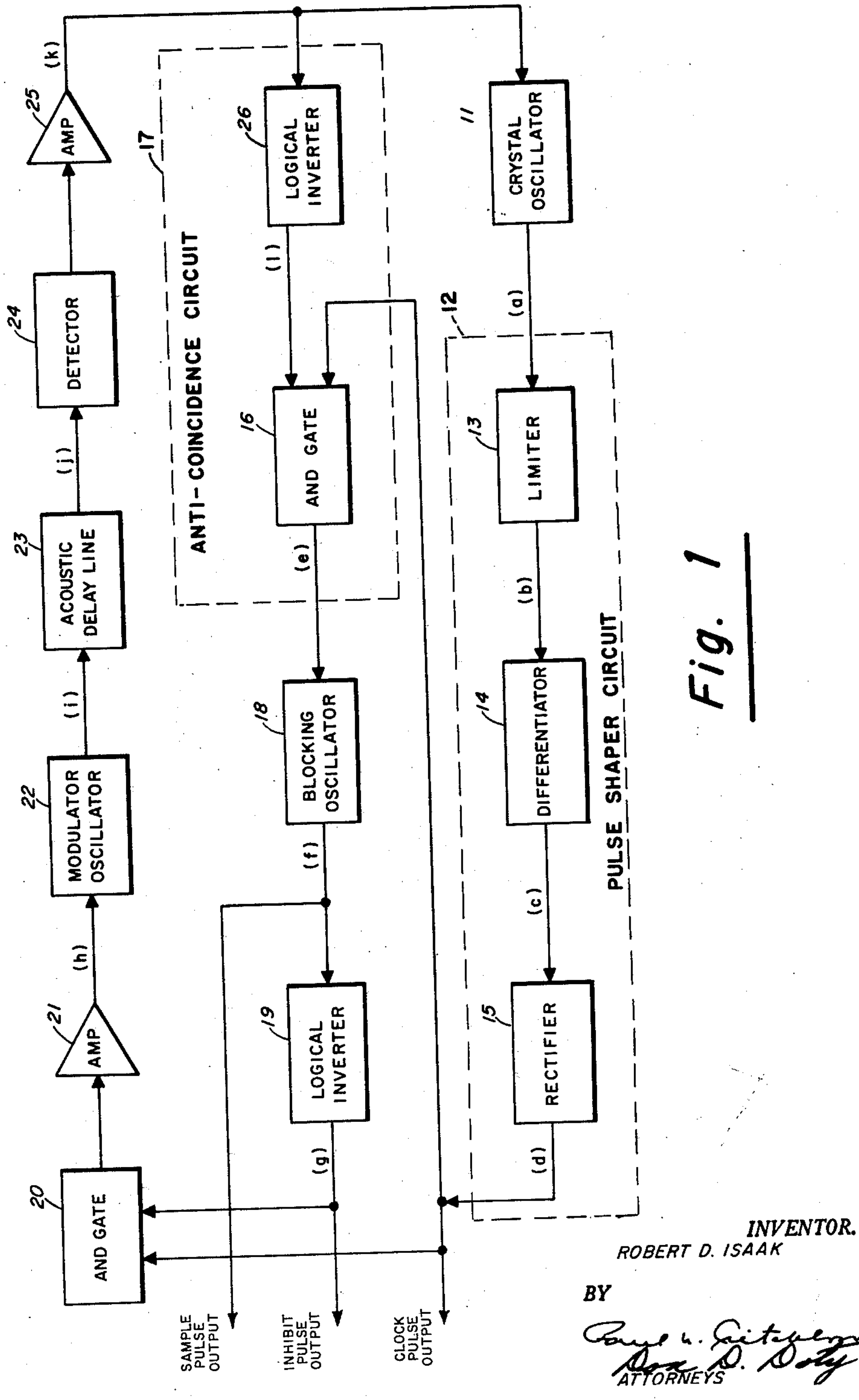
FIG. 1 is a block diagram of the clock pulse—sample pulse—inhibit pulse generator system constituting this invention.

Referring now to the drawing and to FIG. 1 in particular, the subject clock pulse—sample pulse—inhibit pulse generator constituting this invention is shown as having a crystal oscillator 11 which is capable of being driven very slightly off resonance. Typically, this oscillator may, for example, have a normal frequency output of two megacycles which is applied to a pulse shaper means 12, which includes a limiter 13, a differentiator 14, and a rectifier 15. The output of the detector portion of said pulse shaper means is an appropriately formed two megacycle pulse train that constitutes a clock pulse output which functions as a basic timing unit for associated digital sampling and processing equipment and the like, and also enables old data to be recirculated therein.

This clock pulse output is also employed in the subject invention as a basic timing unit for the generation of other timing signals pertinent to proper operation of the aforementioned equipment. It is, therefore, applied as one of a pair of inputs to an And gate 16, which is actually a portion of an anti-coincidence circuit 17 that will be further mentioned in more appropriate context below. The output of And gate 16 drives a blocking oscillator 18, the output of which becomes the sample pulse output, another digital sampling and processing equipment timing unit which allows new data to be timely gated into same.

The output of blocking oscillator 18 is also applied to a logical inverter 19 which, in turn, provides the inhibit pulse output as a third timing unit for blocking the recirculation of an old datum which is to be replaced by a new datum or bit in the sampling and processing equipment. For all practical purposes, the inhibit pulse output is a logical inversion of the aforementioned sample pulse output. Thus, the timing relationship of these signals is the same. But, when considered from a computer terminology standpoint, they differ with respect to significant waveform representation in that generation of a "one" as a sample pulse output automatically causes a "zero" to be simultaneously produced as an inhibit pulse output and vice versa.

Both the inhibit pulse output of logical inverter 19 and the clock pulse output of rectifier 15 are applied as a pair of inputs to another And gate 20, the output of which is amplified to a useful level by pulse amplifier 21 and fed to a modulator oscillator 22 for conversion to the type of corresponding signals that may be fed to and more efficiently used by an acoustic delay line 23. At this time, however, it should be understood that selection of the delay line determines the type of modulator oscillator used, and, furthermore, that the modulator oscillator is an optional component that may be omitted entirely if desired, in event the efficiency of the acoustic delay line chosen is sufficient to produce a useful delayed output signal when the output of amplifier 21 is applied thereto. The output of said acoustic delay line is then detected by a detector 24, the output of which is applied through an amplifier 25 to a logical inverter 26 which, in turn, has its output coupled as the other of said pair of inputs of the aforesaid And gate 16.

The previously mentioned, anti-coincidence circuit 17 actually consists of And gate 16 and logical inverter 26 interrelated as shown. However, for the purpose of this invention, any appropriate "exclusive Or" circuit may be used.

Briefly, the operational environment of the subject invention and the manner in which it works are presented as follows.

Various and sundry electronic signal sampling devices require a plurality of specially formed, correlated, extremely accurate, timing signals for the purpose of timely sampling bits or digital data. For example, the device of patent application Serial Number 585,827 entitled Delay Line Time Compressor, filed May 18, 1956, by Victor C. Anderson (which, as understood, has been allowed and is now ready for issue), ostensibly constitutes such a sampling device, and is susceptible to being combined with the subject invention for actuation by the timing outputs generated thereby. Another device that requires timing pulses of the type generated by this invention is the device disclosed in the patent application presently numbered Navy Case No. 23,760, entitled Secure Sonar Communication System, by Robert D. Isaak, William E. Klund, Woodrow H. Littrell, and Richard G. Stephenson, which is filed in the U.S. Patent Office concurrently with the instant patent application covering the subject invention.

The aforementioned timing signals generated by this invention are a clock pulse output, a sample pulse output, and an inhibit pulse output. These outputs are herein defined as the pulse that simultaneously acts as a basic timer and recirculates old data contained in the sampling devices, the pulse that allows new data to be gated into the sampling device, and the pulse which blocks recirculation of an old datum or bit which is to be replaced by a new datum or bit, respectively.

Figure 2:
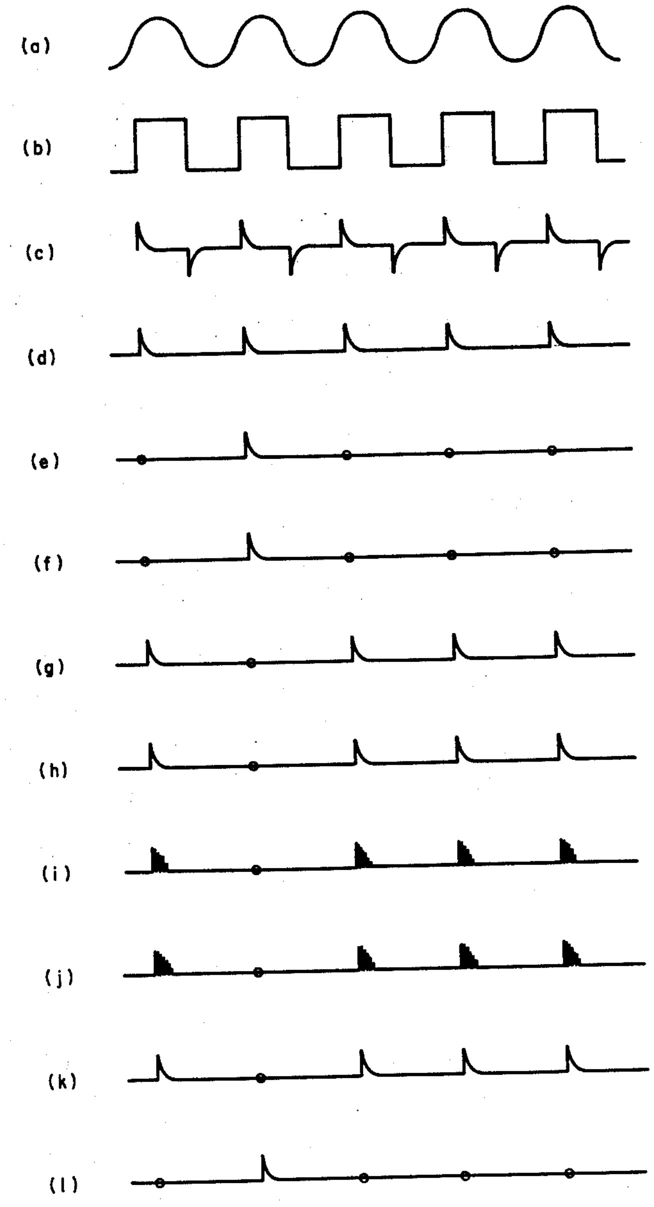
FIG. 2 is a graphical representation of exemplary waveforms constituting the signal outputs of various individual components of the device of FIG. 1.

These clock pulse, sample pulse, and inhibit pulse outputs are timely and accurately generated as a result of the inter-action of the combined components depicted in the system of FIG. 1. Referring now to FIGS. 1 and 2 for a diagrammatical representation of said components and an exemplary representation of the respective waveform outputs therefrom, there is illustrated crystal oscillator 11 which produces sinewave signal (*a*), graphically represented in FIG. 2 (*a*), as the basic timing signal. Waveform (*a*) is then reshaped by limiter 13 which provides a squarewave output (*b*) shown in detail in FIG. 2(*b*). This squarewave is then differentiated by differentiator 14, producing output (*c*), depicted in exemplary fashion by FIG. 2(*c*). In turn, output (*c*) is rectified in rectifier 15 to produce output (*d*), shown in FIG. 2(*d*) to be a pulse train of uniformly timed and shaped pips occurring at a predetermined frequency. Actually, output (*d*) is one of the desired timing pulses, viz., the clock pulse output, with each of the aforementioned pips constituting "ones" when considered from a computer terminology standpoint.

Since the clock pulse output takes two paths within the subject invention it will be described one path at a time for the purpose of clarity. Accordingly, the clock pulse output is applied as one of a pair of inputs to And gate 16 which functions to produce an output signal (*e*) only if both inputs are applied thereto simultaneously. Output (*e*) is graphically represented in FIG. 2(*e*). It should be noted that during an entire sampling cycle only a single pip or "one" occurs in waveform (*e*), and that the remainder of the waveform contains "zeros" where "ones" would ordinarily occur if it were not for the gating action of And gate 16. Output signal (*e*) is applied to trigger blocking oscillator 18 which produces waveform (*f*), shown in FIG. 2(*f*) as being substantially identical to output (*e*), provided no extraneous noise signals are present in the sampling cycle and the basic timing unit, the clock pulse output, is properly applied thereto. It is required that blocking oscillator 18 be so chosen that it cannot be triggered for at least fifty percent of the delay time of the acoustic delay, which may typically be at least for 250 microseconds, and likewise the natural period of the oscillator should be somewhat greater than the delay line delay time, typically about 550 to 750 microseconds. Output (*f*), of course, constitutes another of the basic output pulses required by digital sampling equipment, namely, the sample pulse output.

In order to convert output (*f*) into a signal containing "ones" where "zeros" occurred in output (*e*), and vice versa, it is fed to logical inverter 19. The output signal (*g*) therefrom constitutes the inverted signal and appears pictorially as represented in FIG. 2(*g*). Output (*g*) also constitutes the third and final basic timing unit required by digital sampling devices—the inhibit pulse output.

Outputs (*d*) and (*g*) are applied as a pair of inputs to And gate 20. In event they are applied thereto simultaneously, And gate 20 produces an output which, after amplification, appears similar to output (*h*) illustrated graphically in FIG. 2(*h*) which, in turn, is applied to modulator oscillator 22, which may typically have a delay length of 500 microseconds.

The purpose of using modulator oscillator 22 is to obtain a signal which is proportional to and representative of the output of And gate 20 but which is in a form more readily and efficiently used by the associated acoustic delay line. Hence, if a delay line is selected that efficiently and accurately delays the type of output signal produced by And gate 20, the aforementioned modulator oscillator may be omitted if desired, and the output (*h*) applied directly to acoustic delay line 23.

If modulator 22, however, is incorporated in the subject system, output (*i*) therefrom, represented by the waveform of FIG. 2(*i*), is fed to acoustic delay line 23 where the entire cyclical train of "one" and "zero" signals are shifted or delayed for a time equal to the period between two adjacent signals. Detector 24 then removes the envelope of the modulated (*j*) output and provides output (*k*) shown as the waveform of FIG. 2(*k*). Logical inversion thereof by logical inverter 26 provides output (L), exemplified in FIG. 2(L), which provides the other of the aforesaid pair of inputs to And gate 16. Thus, it can be seen that the output of the anti-coincidence circuit which, in effect, comprises logical inverter 26 and And gate 16, drives the blocking oscillator in such manner that if there should be no sample pulse present, one will be generated by the natural period of the blocking oscillator, and if more than one sample pulse is present during the sample pulse period, the blocking oscillator will prevent the recirculation of more than one pulse due to the fact that it cannot be triggered twice during the period of the delay line. When operation is normal and outputs (*d*) and (L) are applied to And gate 16 at the same time, blocking oscillator 18 will be timely triggered by output (L) which, of course, directly generates and effectively generates the sample pulse output and inhibits pulse output, respectively, in synchronism with their respective clock pulse outputs.

This system of generating a clock pulse, a sample pulse, and an inhibit pulse, in addition to the features which provide self-starting when the power is turned on and always insures generation of one and only one sample pulse every nominal sample pulse period, has the added advantage of a clock which is synchronized with the acoustic delay in that it is effectively slaved thereto. Therefore, any temperature changes which give rise to variations in the lengths of acoustic delay lines will not adversely affect the operation of the system constituting this invention.

Each of the individual components represented by the blocks of FIG. 1 are conventional and well known in the art per se. It is their arrangement and interaction within the system disclosed herein which constitutes the subject invention.

It should be understood, of course, that the foregoing disclosure relates to only a preferred embodiment of the invention and that numerous modifications or alterations may be made therein without departing from the spirit, scope, and purview of the invention as set forth in the appended claims.

What is claimed is:

1. Means for generating a clock pulse, a sample pulse, and an inhibit pulse comprising in combination, a crystal oscillator, a pulse shaper coupled to said crystal oscillator for converting the output thereof to said clock pulse, a modulator oscillator, an acoustic delay line coupled to the output of said modulator oscillator, a detector connected to the output of said acoustic delay line, an anti-coincidence circuit coupled to the outputs of said detector and said pulse shaper, a blocking oscillator connected to the output of said anti-coincidence circuit, a logical inverter coupled to the output of said blocking oscillator, means connected to the outputs of said logical inverter and said pulse shaper for gating a predetermined signal into the aforesaid modulator oscillator when said logical inverter and pulse shaper outputs are simultaneously received thereby, whereby said sample pulse and said inhibit pulse are generated by said blocking oscillator and said logical inverter, respectively, in synchronism with the aforesaid clock pulse from said pulse shaper.

2. The device of claim 1 wherein the blocking oscillator connected to the output of said anti-coincidence circuit has a natural period slightly longer than the period of said sample pulse.

3. A pulse generator adapted for supplying timing pulses for actuating digital sampling devices comprising in combiantion, a crystal oscillator for generating a sinewave signal, shaper means coupled to said crystal oscillator for converting said sinewave signal to a train of clock pulses, a first And gate having a pair of inputs one of which is coupled to said shaper means for response to said clock pulses, an acoustic delay line adapted for producing a delayed output signal effectively connected to the output of said first And gate, a first logical inverter, a second And gate having a pair of inputs one of which is connected for response to the output of said first logical converter and the other of which is connected to said shaper means for response to said clock pulses, a blocking oscillator connected to the output of said second And gate for producing a sample pulse output, a second logical inverter connected to said blocking oscillator for producing an inhibit pulse output in response to said sample pulse output, means interconnecting the output of said second logical inverter and the other of said pair of inputs of said first And gate for supplying said inhibit pulse thereto, and means interconnecting said acoustic delay line with the input of said first logical converter and said crystal oscillator for supplying the delayed output signal therefrom thereto.

4. The device of claim 3 wherein said acoustic delay line has a signal delay time of five hundred microseconds.

5. The device of claim 3 wherein said acoustic delay line has a signal delay time adapted for driving said crystal oscillator at a rate which is synchronous with the natural period thereof.

6. The device of claim 3 wherein said crystal oscillator has a natural frequency which may be varied slightly by the delayed signal from the aforesaid acoustic delay line.

7. Means for generating a clock pulse, a sample pulse, and an inhibit pulse adapted for timing electronic equipment comprising in combination, modulator oscillator means for producing a train of signals containing a predetermined frequency as the output therefrom, means coupled to the output of said modulator oscillator means for delaying said train of signals an amount of time equal to the period between two adjacent signals thereof, detector means connected to the output said delaying means for producing the envelope of said delayed train of signals containing a predetermined frequency, a first logical inverter effectively coupled to the output of said detector means, a first And gate having a pair of inputs one of which is coupled to the output of said logical inverter, a blocking oscillator having a natural period longer than the sample pulse being generated connected to said first And gate for producing a sample pulse output in response to the output therefrom, a second logical inverter coupled to the output of said blocking oscillator for converting said sample pulse output into an inhibit pulse output, a crystal controlled oscillator adapted for being driven slightly off resonance and at a rate which is synchronous with the natural period of said delaying means for producing a predetermined frequency sine wave signal, shaping means connected to said crystal controlled oscillator for converting said sine wave signal into a train of clock pulses having a frequency identical therewith, means connected to the outputs of said shaping means and the aforementioned second logical inverter for triggering said modulator oscillator upon simultaneous reception of said clock and inhibit pulses respectively therefrom, and means interconnecting the output of the aforesaid detector means and the input of said crystal controlled oscillator for driving same in synchronism with the natural period of said delaying means.

8. A pulse generator consisting of means for generating a clock pulse, an And gate having one of the inputs thereof coupled to the output of said clock pulse generating means, an acoustical delay line effectively coupled to the output of said And gate, an anti-coincidence circuit connected for response to the output of said delay line and the aforesaid clock pulse, a blocking oscillator coupled to the output of said anti-coincidence circuit for producing a sample pulse as the output therefrom, a logical inverter coupled to the output of said blocking oscillator for generating an inhibit pulse in response to said sample pulse, and means connected to the output of said logical inverter for supplying said inhibit pulse to the other input of the aforesaid And gate.

9. The device of claim 8 wherein said anti-coincidence circuit comprises a logical inverter responsive to output of said acoustic delay line, and another And gate having one of the inputs thereof connected to said logical inverter for response to the output therefrom and the other input thereof coupled to the output of the aforesaid clock pulse generating means.

References Cited in the file of this patent

UNITED STATES PATENTS

| | | |
|---|---|---|
| 2,857,526 | Galton | Oct. 21, 1958 |
| 2,953,694 | Wilson | Sept. 20, 1960 |